(12) United States Patent
Logsdon

(10) Patent No.: US 7,360,507 B1
(45) Date of Patent: Apr. 22, 2008

(54) ENERGY SAVING APPARATUS

(76) Inventor: Mearl G. Logsdon, 1837 Lobero La., Modesto, CA (US) 95355

( * ) Notice: Subject to any disclaimer, the term of this patent is extended or adjusted under 35 U.S.C. 154(b) by 159 days.

(21) Appl. No.: 11/259,929

(22) Filed: Oct. 28, 2005

(51) Int. Cl.
*F28D 21/00* (2006.01)
(52) U.S. Cl. ............... 122/367.1; 122/19.1; 122/20 B
(58) Field of Classification Search ............ 122/13.3, 122/15.1, 19.1, 19.2, 20 B, 31.1, 32, 367.1
See application file for complete search history.

(56) References Cited

U.S. PATENT DOCUMENTS

| | | | |
|---|---|---|---|
| 3,793,992 A | 2/1974 | Marquez | |
| 3,987,761 A | 10/1976 | Downs et al. | |
| 4,037,567 A | 7/1977 | Torres | |
| 4,175,518 A * | 11/1979 | Reames, Jr. | 122/20 B |
| 4,371,111 A * | 2/1983 | Pernosky | 237/8 R |
| 4,373,473 A * | 2/1983 | Grandmont | 122/20 B |
| 4,887,586 A * | 12/1989 | Walters | 126/101 |
| 4,938,172 A * | 7/1990 | Belovarac | 122/20 B |
| D440,287 S | 4/2001 | Jackson et al. | |
| 6,564,755 B1 | 5/2003 | Whelan | |

\* cited by examiner

*Primary Examiner*—Gregory Wilson

(57) ABSTRACT

An energy saving apparatus is described. The energy saving apparatus is attached to a standard gas-powered water heater. All gas-powered water heaters typically have an air vent which vents hot air from the water heater. The apparatus takes advantage of this fact by routing a cold water inlet line into a heating coil wrapped around the air vent, with the heating coil eventually being connected to an outlet water line that then enters the hot water heater. The heating coil is merely a water line located in between the cold water inlet line and the outlet water line that is wrapped around the air vent many times. The heat from the air vent will transfer some of its heat to the water circulating within the heating coil, causing the hot water heater to utilize this otherwise wasted energy and subsequently causing the hot water heater to need less energy to heat the water within the hot water heater.

4 Claims, 4 Drawing Sheets

ENERGY SAVING APPARATUS

BACKGROUND OF THE INVENTION

The present invention concerns that of a new and improved energy saving apparatus.

DESCRIPTION OF THE PRIOR ART

U.S. Pat. No. 3,793,992, issued to Marquez, discloses an attachment or accessory water heater for mounting on the exhaust gas flue of a gas-fired water heater such as those sold for domestic use.

U.S. Pat. No. 4,037,567, issued to Torres, discloses a water heating system which includes a boiler which is connected with a source of water supply for receiving water under pressure.

U.S. Pat. No. 6,564,755, issued to Whelan, discloses a heat recovery system which includes a heat exchanger surrounding a flue pipe from a furnace for preheating water.

U.S. Pat. No. D440,287, issued to Jackson et al., discloses an ornamental design for a water heater top.

U.S. Pat. No. 3,987,761, issued to Downs et al., discloses an auxiliary water heating tank to be employed in combination with a conventional tank water heater which is gas fired.

SUMMARY OF THE INVENTION

The present invention concerns that of a new and improved energy saving apparatus. The energy saving apparatus is attached to a standard gas-powered water heater. All gas-powered water heaters typically have an air vent which vents hot air from the water heater. The apparatus takes advantage of this fact by routing a cold water inlet line into a heating coil wrapped around the air vent, with the heating coil eventually being connected to an outlet water line that then enters the hot water heater. The heating coil is merely a water line located in between the cold water inlet line and the outlet water line that is wrapped around the air vent many times. The heat from the air vent will transfer some of its heat to the water circulating within the heating coil, causing the hot water heater to utilize this otherwise wasted energy and subsequently causing the hot water heater to need less energy to heat the water within the hot water heater.

There has thus been outlined, rather broadly, the more important features of an energy saving apparatus that the detailed description thereof that follows may be better understood and in order that the present contribution to the art may be better appreciated. There are, of course, additional features of the energy saving apparatus that will be described hereinafter and which will form the subject matter of the claims appended hereto.

In this respect, before explaining at least one embodiment of the energy saving apparatus in detail, it is to be understood that the energy saving apparatus is not limited in its application to the details of construction and to the arrangements of the components set forth in the following description or illustrated in the drawings. The energy saving apparatus is capable of other embodiments and being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present energy saving apparatus. It is important, therefore, that the claims be regarded as including such equivalent constructions insofar as they do not depart from the spirit and scope of the present invention.

It is therefore an object of the present invention to provide a energy saving apparatus which has all of the advantages of the prior art and none of the disadvantages.

It is another object of the present invention to provide an energy saving apparatus which may be easily and efficiently manufactured and marketed.

It is another object of the present invention to provide an energy saving apparatus which is of durable and reliable construction.

It is yet another object of the present invention to provide an energy saving apparatus which is economically affordable and available for relevant market segment of the purchasing public.

Other objects, features and advantages of the present invention will become more readily apparent from the following detailed description of the preferred embodiment when considered with the attached drawings and appended claims.

DESCRIPTION OF THE PREFERRED EMBODIMENT

Figure 1:
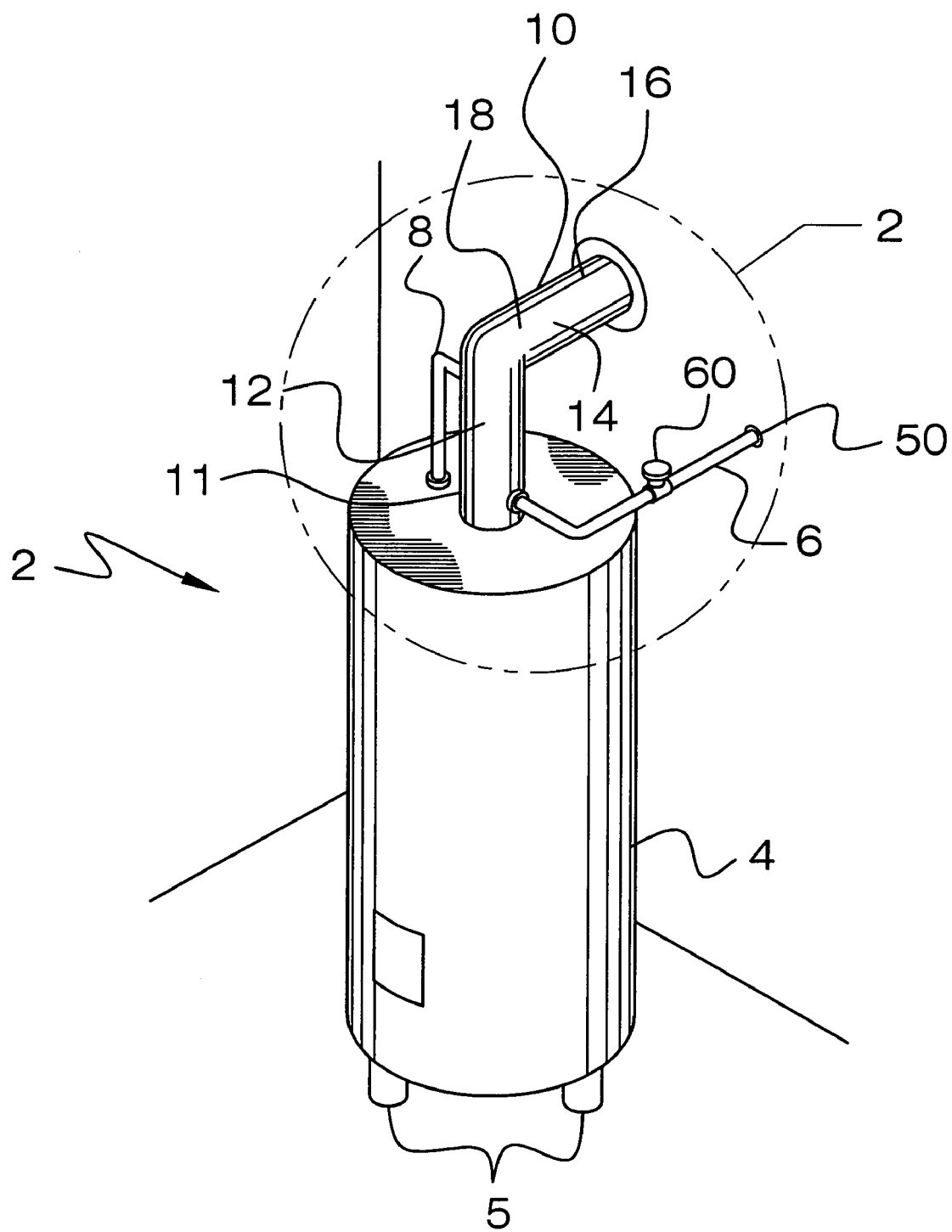
FIG. 1 shows a perspective view of the energy saving apparatus as it would appear in use.
Figure 2:
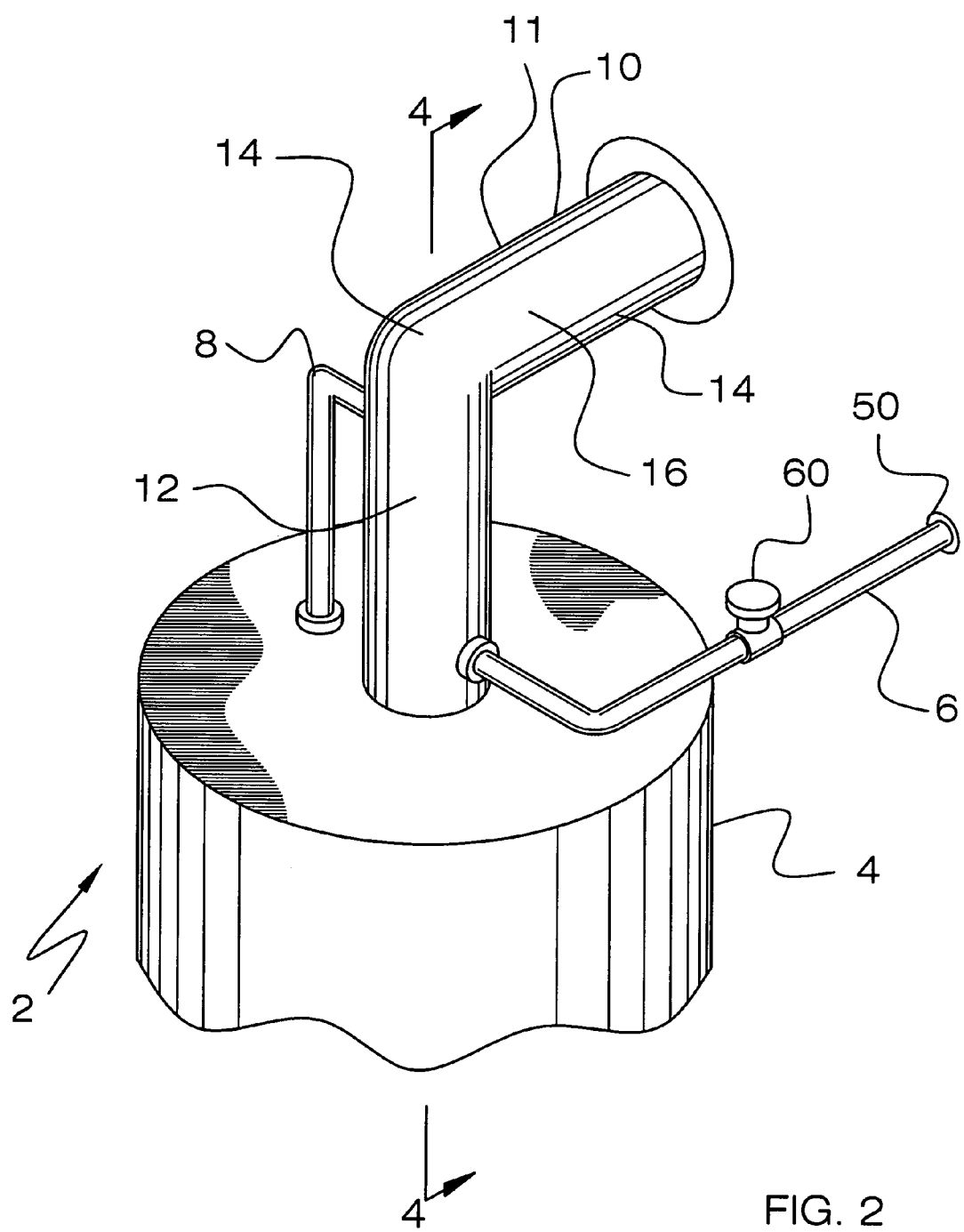
FIG. 2 shows a close-up perspective view of the energy saving apparatus as it would appear in use.
Figure 3:
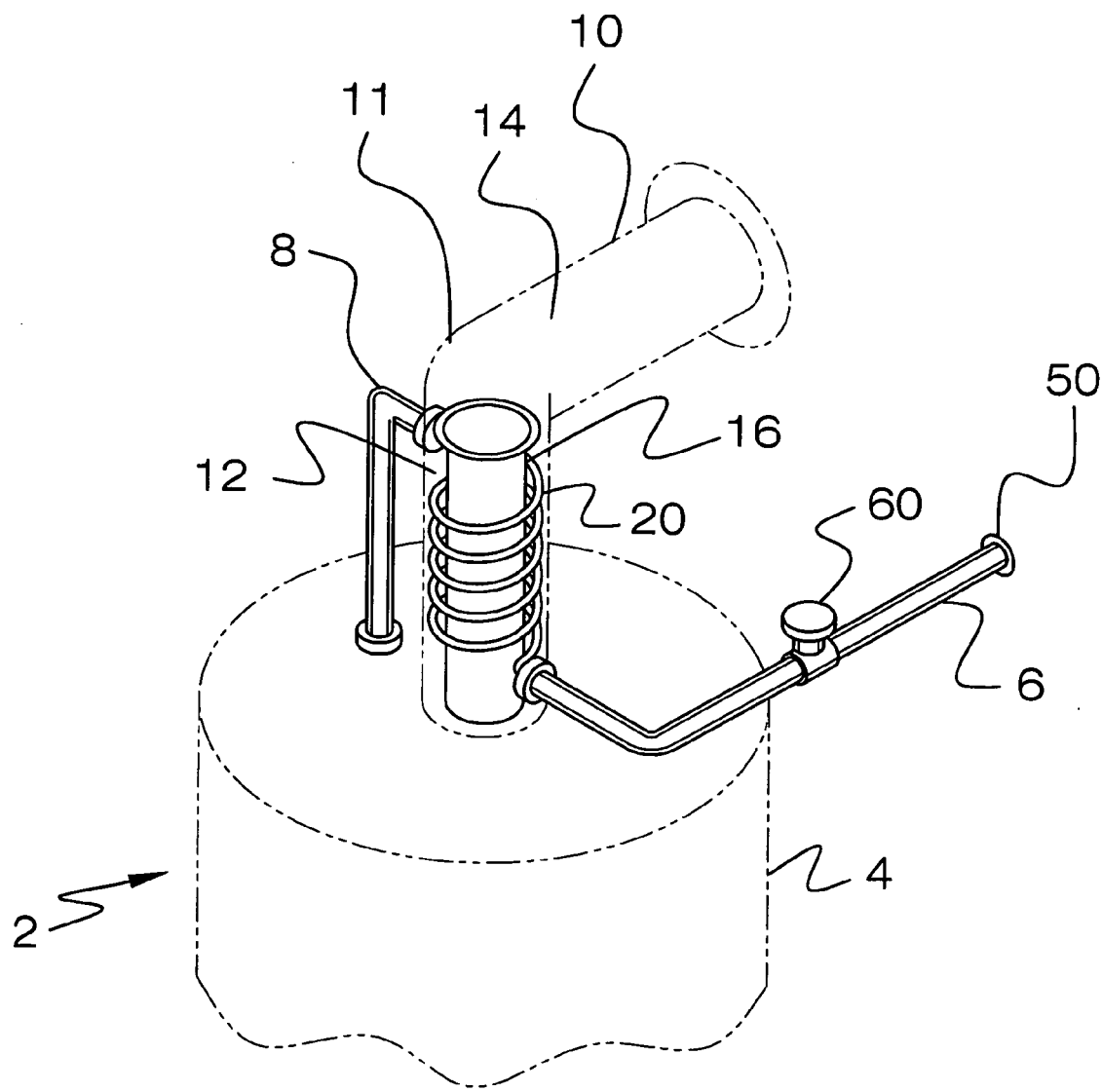
FIG. 3 shows a close-up cutaway perspective view of the energy saving apparatus as it would appear in use.
Figure 4:
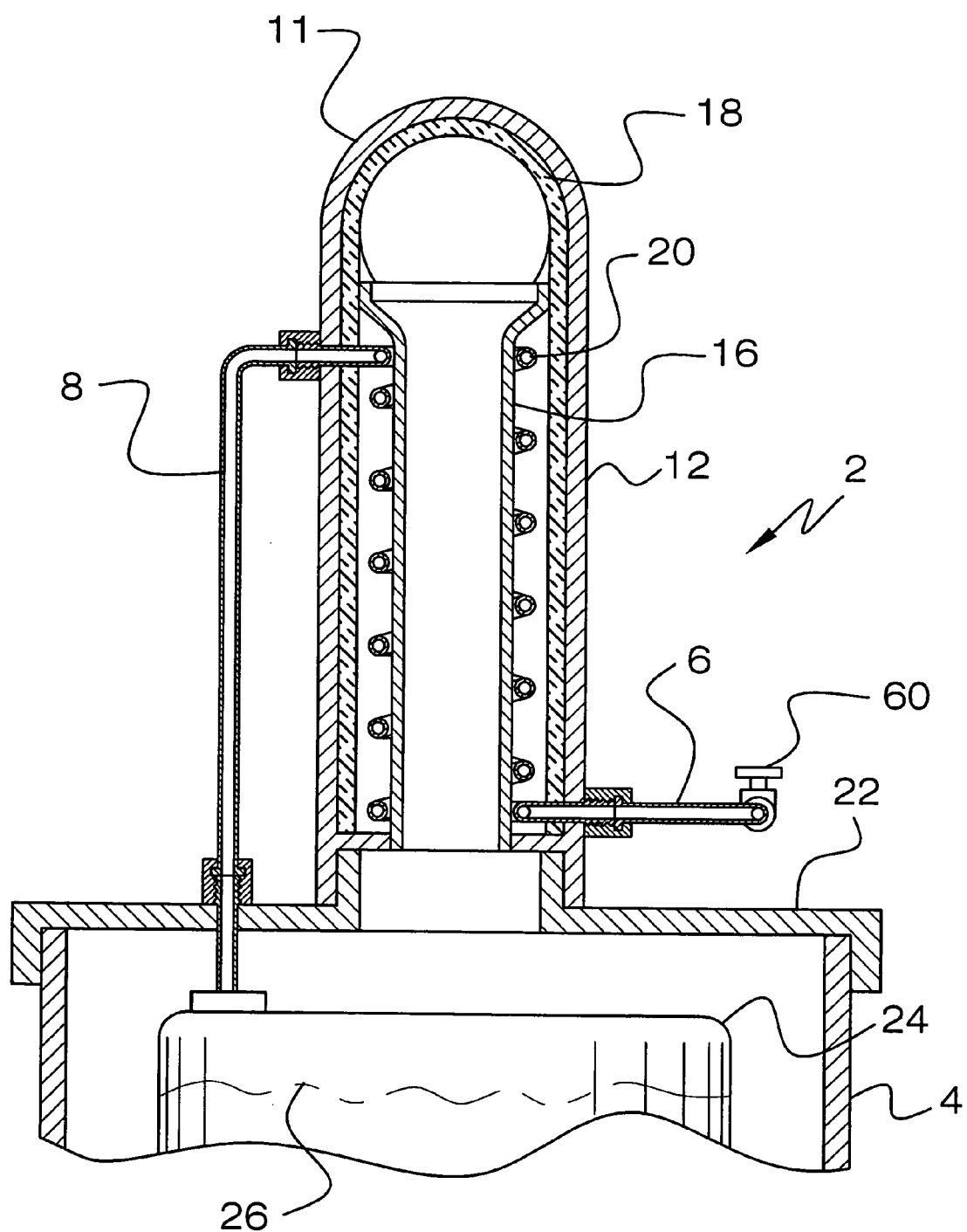
FIG. 4 shows a side cutaway view of the energy saving apparatus as it would appear in use.

With reference now to the drawings, and in particular to FIGS. 1 through 4 thereof, a new energy saving apparatus embodying the principles and concepts of the present invention and generally designated by the reference numeral 2 will be described.

As best illustrated in FIGS. 1 through 4, the energy saving apparatus 2 comprises a water heater 4 that has two ends, a top end and a bottom end. The bottom end of the water heater 4 is mounted on a plurality of stands 5. Usually, a water heater 4 is mounted within a garage that is adjacent to a residence or structure, but it can also be located in a closet or interior area within the residence or structure. Usually, the water heater 4 is cylindrical in nature.

The water heater 4 itself comprises an external cover 22, which covers an inner tank 24. The inner tank 24 usually has a volume of hot water 26 within it that utilized within the residence or structure for bathing purposes and other general hot water needs and uses.

An elbow-shaped vent 11 is attached to the top of the water heater 4. The elbow-shaped vent 11 comprises horizontal pipe 14 which has two ends, a top end and a bottom end, and further, comprises a vertical pipe 12 that has two ends, a first end and a second end. The bottom end of the horizontal pipe 14 is attached to the inner tank 24, extends upward through the external cover 22 of the water heater 4, and is connected to the first end of the vertical pipe 12 at a ninety degree angle. The second end of the vertical pipe 12 is connected to an external wall surface and vents out hot air and gases that form within the inner tank 24.

The vent 11 further comprises an inner vent tube 16, an insulation layer 18 that surrounds certain areas of the inner vent tube 16, and an outer vent tube 10 that covers up both inner vent tube 16 and the insulation layer 18. Both the inner vent tube 16 and the outer vent tube 10 are tubular in nature, and thus, have a circumference. Within the horizontal pipe 14 portion of the vent 11, the inner vent tube 16, the insulation layer 18, and the outer vent tube 10 are all in continuous contact with one another. However, in the vertical pipe 12 section of the vent 11, there is a gap in between the insulation layer 18 and the inner vent tube 16. However, the outer vent tube 10 and the insulation layer 18 are continuous with one another.

A cold water inlet line 6 has two ends, a first end and a second end. The first end of the inlet line 6 is connected to water source 50, while the second end of the inlet line 6 enters through the outer vent tube 10. A valve 60 is located on the inlet line 6 control incoming water flow. Located within the vertical pipe 12 portion of the vent 11 is located a heating coil 20, with the heating coil 20 having two ends, a top end and a bottom end. The bottom end of the heating coil 20 is connected to the second end of the inlet line 6.

An outlet line 8 has two ends, a first end and a second end. The first end of the outlet line 8 travels through the outer vent tube 10 and is connected to the top end of the heating coil 20, while the second end of the outlet line 8 travels through the outer cover 22 of the water heater 4 and deposits incoming water 26 into the inner tank 24 of the water heater 4.

The heating coil 20 is circumferentially wrapped around the inner vent tube at least several times, or "circumferences," in between its connection with the cold water inlet line 6 and the outlet line 8.

In use, the volume of water 26 within the water heater 4 will usually give off a tremendous amount of heat, as the water 26 is usually kept in a hot state by the water heater 4. In such a state, the water 26 gives off heat, which escapes through the air vent 11. Some of this heat will transfer through the inner vent tube 16 and contact the heating coil 20, where it will transfer some of its heat to the water circulating within the heating coil, causing the hot water heater to utilize this otherwise wasted energy and subsequently causing the hot water heater to need less energy to heat the water within the hot water heater.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An energy saving apparatus comprising:
   (a) a water heater, the water heater having two ends, a top end and a bottom end, the water heater comprising an inner tank, the inner tank having a volume of hot water, the water heater further comprising an external cover that covers the inner tank,
   (b) means for mounting the water heater,
   (c) a vent attached to the top end of the water heater, the vent having an elbow-shape, the vent being fabricated from two pipes comprising a vertical pipe and a horizontal pipe, the vertical pipe having two ends, a top end and a bottom end, the horizontal pipe having two ends, a first end and a second end, the bottom end of the vertical pipe being attached to the tank within the water heater, the top end of the vertical pipe being connected to the first end of the horizontal pipe, the second end of the horizontal pipe being connected to an external wall surface, the vent further including an outer vent tube, the vent further including a layer of insulation that is attached to the outer vent tube within the outer vent tube, the vent further including an inner vent tube located within the layer of insulation, wherein the inner vent tube is attached to the insulation in only the horizontal pipe portion of the vent,
   (d) a water source,
   (e) a cold water inlet line having two ends, a first end and a second end, the first end of the cold water inlet line being attached to the water source,
   (f) an outlet line having two ends, a first end and a second end, the second end of the outlet line being connected to the tank of the water heater, and
   (g) means for heating water traveling from the cold water inlet line to the outlet line.

2. An energy saving apparatus according to claim 1 wherein the means for heating water traveling from the cold water inlet line to the outlet line further comprises
   (a) a heating coil having two ends, a top end and a bottom end,
   (b) wherein the heating coil is circumferentially wrapped around the inner vent tube in the vertical pipe section of the vent through several circumferences of the inner vent tube,
   (c) further wherein the top end of the heating coil is attached to the first end of the outlet line, and
   (d) further wherein the bottom end of the heating coil is attached to the second end of the cold water inlet line,
   (e) further wherein heat arising from the volume of hot water within the tank of the water heater will pass through the inner vent tube, heating the inner vent tube,
   (f) further wherein the inner vent tube will heat the heating coil,
   (g) further wherein the heating coil will heat water passing through the heating coil from the cold water inlet line and the outlet line.

3. An energy saving apparatus according to claim 2 wherein the means for mounting the water heater further comprises a plurality of stands attached to the bottom end of the water heater.

4. An energy saving apparatus according to claim 3 wherein the water heater is cylindrical in nature.

* * * * *